US008726146B2

(12) United States Patent
Fisher

(10) Patent No.: US 8,726,146 B2
(45) Date of Patent: May 13, 2014

(54) SYSTEMS AND METHODS FOR VIDEO CONTENT ASSOCIATION

(75) Inventor: Michael Fisher, Mount Kisco, NY (US)

(73) Assignee: Advertising.Com LLC, Dulles, VA (US)

( * ) Notice: Subject to any disclaimer, the term of this patent is extended or adjusted under 35 U.S.C. 154(b) by 1401 days.

(21) Appl. No.: 12/101,650

(22) Filed: Apr. 11, 2008

(65) Prior Publication Data

US 2009/0259927 A1    Oct. 15, 2009

(51) Int. Cl.
*G06F 17/00* (2006.01)

(52) U.S. Cl.
USPC .......................................... 715/234; 715/205

(58) Field of Classification Search
USPC .......................................... 715/205, 208, 234
See application file for complete search history.

(56) References Cited

U.S. PATENT DOCUMENTS

| | | | |
|---|---|---|---|
| 5,796,952 A | 8/1998 | Davis et al. |
| 5,835,087 A | 11/1998 | Herz |
| 5,835,712 A | 11/1998 | DuFresne |
| 5,870,559 A | 2/1999 | Leshem et al. |
| 5,905,862 A | 5/1999 | Hoekstra |
| 5,933,822 A | 8/1999 | Braden-Harder et al. |
| 5,948,061 A | 9/1999 | Merriman et al. |
| 5,958,008 A | 9/1999 | Pogrebisky et al. |
| 5,983,237 A | 11/1999 | Tain et al. |
| 5,987,457 A | 11/1999 | Ballard |
| 6,035,332 A | 3/2000 | Ingrassia, Jr. et al. |
| 6,078,866 A | 6/2000 | Buck et al. |
| 6,078,916 A | 6/2000 | Culliss |
| 6,169,986 B1 * | 1/2001 | Bowman et al. .................. 1/1 |
| 6,256,633 B1 | 7/2001 | Dharap |
| 6,269,361 B1 | 7/2001 | Davis et al. |
| 6,308,202 B1 | 10/2001 | Cohn et al. |
| 6,356,899 B1 | 3/2002 | Chakrabarti et al. |
| 6,366,298 B1 | 4/2002 | Haitsuka et al. |
| 6,370,527 B1 | 4/2002 | Singhal |
| 6,453,315 B1 | 9/2002 | Weissman et al. |
| 6,523,026 B1 | 2/2003 | Gillis |
| 6,526,440 B1 | 2/2003 | Bharat |
| 6,668,256 B1 | 12/2003 | Lynch |
| 6,704,727 B1 | 3/2004 | Kravets |

(Continued)

FOREIGN PATENT DOCUMENTS

| | | |
|---|---|---|
| WO | WO 00/68839 | 11/2000 |
| WO | WO 00/75814 | 12/2000 |

(Continued)

OTHER PUBLICATIONS https://www.google.com/adsense/overview, "Unleash the full revenue potential of your website with Google Adsense", Jan. 14, 2004, 3 pages.

(Continued)

*Primary Examiner* — Manglesh M Patel
(74) *Attorney, Agent, or Firm* — Finnegan, Henderson, Farabow, Garrett & Dunner, LLP

(57) ABSTRACT

Methods and apparatus are disclosed to identify and associate video content. In one implementation, a method is provided that includes requesting a webpage by a user computer and determining whether a keyword is present on the webpage requested by the user computer. Furthermore, the method includes creating a link on the webpage from the keyword to the video file and displaying the video file when the link is activated.

21 Claims, 7 Drawing Sheets

(56) References Cited

U.S. PATENT DOCUMENTS

| | | |
|---|---|---|
| 6,754,873 B1 | 6/2004 | Law et al. |
| 7,174,346 B1 | 2/2007 | Gharachorloo et al. |
| 7,231,399 B1 | 6/2007 | Bem et al. |
| 7,249,121 B1 | 7/2007 | Bharat et al. |
| 7,257,585 B2 * | 8/2007 | Stevenson et al. ............ 707/809 |
| 7,877,395 B2 * | 1/2011 | Sarukkai et al. .............. 707/754 |
| 7,933,338 B1 * | 4/2011 | Choudhry et al. ....... 375/240.26 |
| 2002/0010625 A1 | 1/2002 | Smith et al. |
| 2002/0107735 A1 | 8/2002 | Henkin et al. |
| 2002/0123912 A1 | 9/2002 | Subramanian et al. |
| 2002/0143808 A1 * | 10/2002 | Miller et al. ................ 707/501.1 |
| 2003/0088554 A1 | 5/2003 | Ryan et al. |
| 2004/0059708 A1 | 3/2004 | Dean et al. |
| 2004/0172389 A1 | 9/2004 | Galai et al. |
| 2004/0177015 A1 | 9/2004 | Galai et al. |
| 2004/0181525 A1 | 9/2004 | Itzhak et al. |
| 2005/0038814 A1 * | 2/2005 | Iyengar et al. ............. 707/104.1 |
| 2005/0149499 A1 | 7/2005 | Franz et al. |
| 2005/0267872 A1 | 12/2005 | Galai et al. |

FOREIGN PATENT DOCUMENTS

| | | |
|---|---|---|
| WO | WO 01/44992 | 6/2001 |
| WO | WO 02/037220 | 5/2002 |
| WO | WO 03/012576 | 2/2003 |
| WO | WO 03/017023 | 2/2003 |
| WO | WO 2004/010331 | 1/2004 |
| WO | WO 2004/111771 | 12/2004 |
| WO | WO 2005/119423 | 12/2005 |

OTHER PUBLICATIONS

International Search Report for Application No. PCT/IL/02/00669, Jun. 11, 2003, 4 pages.
International Search Report for Application No. PCT/IL02/00616, Aug. 21, 2003, 4 pages.
International Search Report for Application No. PCT/IL03/00598, Nov. 5, 2003, 4 pages.
International Search Report for Application No. PCT/US05/018996, May 17, 2007, 3 pages.
Office Action dated Mar. 6, 2007 Issued by USPTO in commonly-owned U.S. Pub. No. 2005/0267872, 11 pgs.
Search Report for commonly-owned European Patent Application No. 02755591.1, 5 pages.
Bharat K et al.; "A technique for measuring the relative size and overlap of public Web search engines" Computer Networks and ISDN Systems, North Holland Publishing, Amsterdam, NL; vol. 30, No. 1-7, Apr. 1998, pp. 379-388.
Hirai J. et al.: "WebBase: a repository of Web pages" Computer Networks, Elsevier Science Publishers B.V., Amsterdam, NL; vol. 33, No. 1-6, Jun. 2000, pp. 277-293.

* cited by examiner

SYSTEMS AND METHODS FOR VIDEO CONTENT ASSOCIATION

FIELD OF THE INVENTION

The present invention relates generally to systems and methods for associating content and, more particularly, to systems and methods for associating video content with text or other static content on a webpage or other form of published media.

BACKGROUND OF THE INVENTION

Content publication via the Internet is quickly becoming the primary means for distribution of media and information to the public. Content publishers, such as newspapers, magazines, authors, and reporters are now provided with capabilities via the Internet that were never before possible with print media. Significantly, the Internet enables the simultaneous distribution of text, imagery, and video in one medium. Video is a powerful from of media distribution and that drives a tremendous amount of consumer interest. Rather than reading the news, more and more people are watching clips of the events that create the news. In fact, video distribution on the Internet is growing at an exponential pace. For example, the popular www.youtube.com website enables the viral distribution of video content in a way that allows viewers to upload, watch, search, rank, and comment on a virtually unending database of video files.

Despite the widespread availability of video content, online content publishers face significant problems in associating video or moving imagery with written text and/or static images. It is often difficult, time consuming, and costly for an online content publisher to determine which videos from a video library to associate with a particular webpage, portion of a webpage or text within a webpage. Furthermore, as both written content catalogues and video content catalogues are constantly being updated, the process of association between the two becomes a perpetual task.

Therefore, many online content publishers find that they are unable to adequately leverage their video catalog. Specifically, content publishers often find that conventional web development and publication tools and software packages do not permit them to efficiently and effectively publish, display, and associate video content on the webpages throughout their website.

In addition to facing difficulties in publishing their video content, content publishers often face significant problems in attempting to monetize their video catalog. For example, conventional web development tools and software packages do not provide a way to dynamically link advertisers with specific video content. Additionally, many conventional tools do not allow content publishers to sell advertising for a specific instance of the display of a particular video file. Additionally, many conventional tools do not allow content publishers to sell banner ads in association with the display of a particular video file.

Advertisers desire the ability to spend their advertising dollars on consumers interested in topics relevant to their goods or services. For example, a brokerage house, bank, or manufacturer of accounting software may contract with a webpage provider to have an advertisement displayed within a webpage related to stock markets and financial data. The idea according to this approach is that end-users are more likely to "click-through" or otherwise respond to advertisements that are closely related to the content of the webpage.

In another approach, advertisements can be selected for display within a webpage substantially in real time based on demographical information of the particular user who is accessing the webpage. For example, each user may be required to complete a questionnaire, provided via the Internet, as a prerequisite to receiving access to the webpage. Alternatively, a profile may be created for a user based on the user's activities while on-line including, for example, an indication of the webpages visited, how frequently and for how long those webpages are visited, how often the user makes a purchase on-line, and any demographic information the user supplies in the course of visiting websites. Demographic information may also be collected and retained by providers of webpages through the use of "cookies". The idea according to this approach is that end-users are more likely to "click-through" or otherwise respond to advertisements that are closely related to the user's interests and characteristics. Advertises desire the ability to leverage such user data in connection with the delivery of video footage.

Content publishers desire a tool or application that can enable them to leverage the full capability of their video catalogues. Furthermore, content publishers desire to have the ability to connect advertisers to consumer interest in specific portions of the content publisher's video catalogue. In view of the foregoing, it would be advantageous to provide an improved system and method for video content association.

BRIEF SUMMARY OF THE INVENTION

The present invention describes systems and methods to associate video content. An exemplary embodiment of the present invention provides a method for associating video content involving the steps of requesting a webpage by a user computer and determining whether a keyword is present on the webpage requested by the user computer. Furthermore, the method includes the step of creating a link on the webpage from the keyword to the video file. Additionally, the method involves displaying the video file when the link is activated.

In addition to methods for associating video content, the present invention provides a system for video content association. The system for video content association includes at least one video file stored in a database. Furthermore, the system for video content association includes a video association controller configured to receive a request for video content association when a webpage is requested by a user computer and to determine whether the webpage contains at least one keyword. Furthermore, the video association controller is configured to display a link on the webpage from the at least one keyword to the at least one video file.

These and other objects, features and advantages of the present invention will become more apparent upon reading the following specification in conjunction with the accompanying drawing figures.

DETAILED DESCRIPTION OF PREFERRED EMBODIMENTS

The present invention addresses the deficiencies in the prior art concerning the ability of publishers to display, target and monetize video catalogues. Significantly, the present invention provides methods and apparatus for efficient and effective association of video content to static webpage content. A system for video content association provided in accordance with the present invention is enabled to effectively respond to requests for particular webpages and dynamically link videos to content contained within the individual webpage. Additionally, the present invention overcomes the drawbacks of the conventional methods and systems in the prior art and provides systems and methods to automatically associate video content with a published webpage and permit real time modification and optimization of that video association.

In an exemplary embodiment, the present invention provides a method for associating video content involving the steps of requesting a webpage by a user computer and determining whether a keyword is present on the webpage requested by the user computer. Furthermore, the method includes the step of creating a link on the webpage from the keyword to the video file. Additionally, the method involves displaying the video file when the link is activated.

In addition to methods for associating video content, the present invention provides a system for video content association. The system for video content association includes at least one video file stored in a database. Furthermore, the system for video content association includes a video association controller configured to receive a request for video content association when a webpage is requested by a user computer and to determine whether the webpage contains at least one keyword. Furthermore, the video association controller is configured to display a link on the webpage from the at least one keyword to the at least one video file.

The systems and methods of the present invention present many advantages over the prior art. Content publishers face significant difficulty in attempting to associate dynamic content, like videos and audio, with static content, like text and graphics. The present invention provides, among other things, a system for video content association 100 that enables a content publisher to leverage their video catalogue with the strength of their static content, such as a text article. Therefore, a user can be enabled to search text for a relevant article and then be presented with a catalogue of related and associated video files. Additionally, the various embodiments of the system for video content association 100 can enable the content publisher to monetize their video catalogues by enabling the content publisher to sell advertising related to and associated with the subject, theme, or category of a given video file or group of video files.

Figure 1:
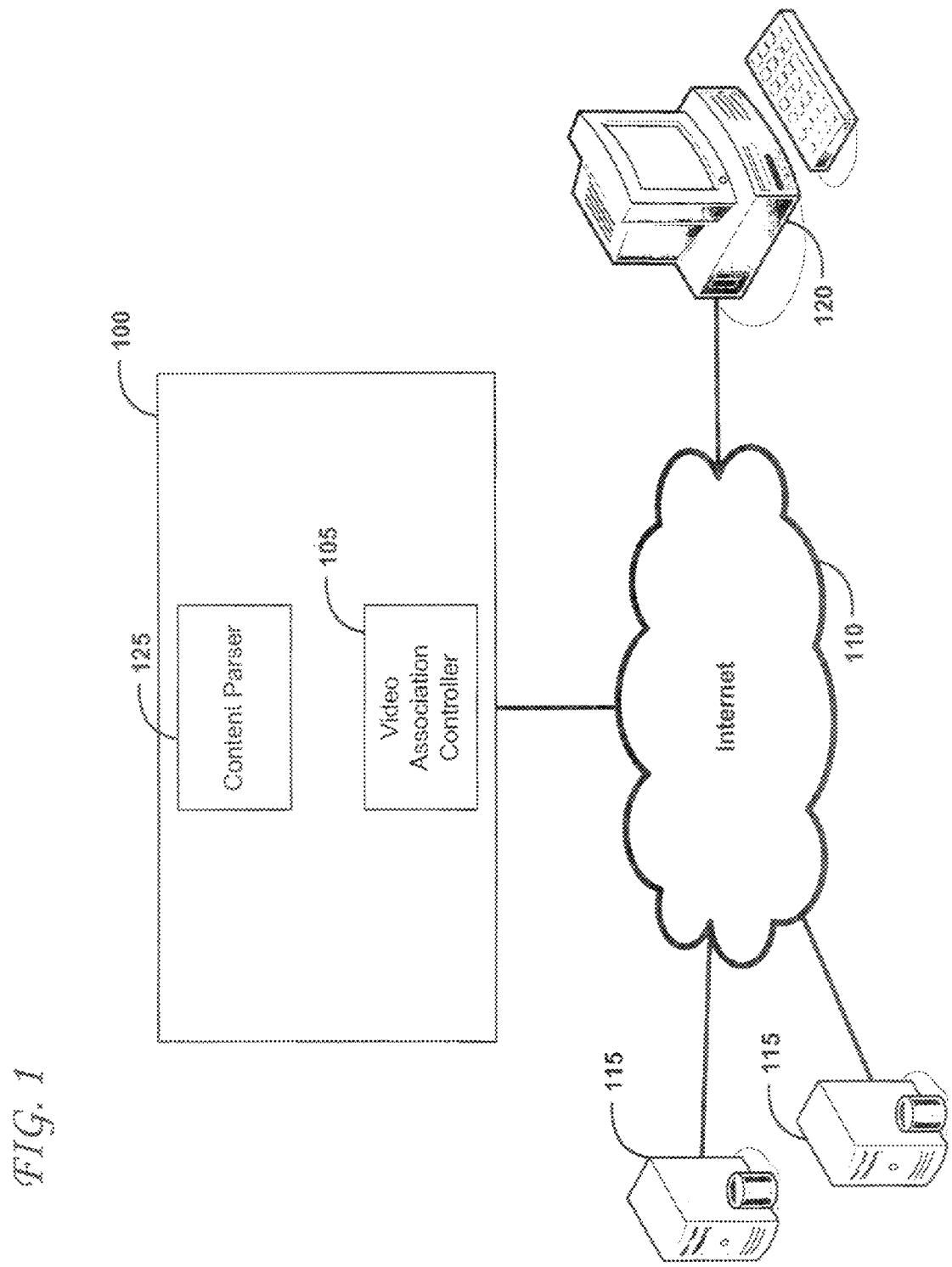
FIG. 1 provides an illustration of the architecture for a system for video content association 100 in accordance with an exemplary embodiment of the present invention.

FIG. 1 provides an illustration of the architecture for a system for video content association 100 in accordance with an exemplary embodiment of the present invention. As shown in FIG. 1, the system for video content association 100 can be configured in communication with a network, such as the Internet 110. This connection to the Internet 110 enables communication with a variety of other associated or independent devices and networks. In the exemplary embodiment shown in FIG. 1, a series of content publishers 115 can be connected to the Internet 110. Additionally, a user computer 120 can be connected to the Internet 100. Thereby, the system for video content association 100 is permitted to communicate with both the content publishers 115 and the user computer 120. Each of user computer(s) 120, content publishers 115, and system for video content association 100 may be in electrical communication with Internet 110 via a suitable communications capability such as, for example, a cable or satellite connection, a local area network ("LAN"), any other suitable wired, wireless, or optical connection, or a combination thereof.

The exemplary embodiment of the user computer 120 shown in FIG. 1 may include any suitable computing equipment for accessing content (e.g., webpages) over the Internet 110 and displaying video to end user(s) at user computer 120. For example, in the exemplary embodiment shown in FIG. 1, user computer 120 can be a desktop computer. In other examples, user computer 120 can be a laptop computer, telephone (e.g., mobile phone), personal digital assistant ("PDA"), BlackBerry device, or any other suitable computing device. User computer 120 can have a web browser (e.g., Internet Explorer, Netscape Navigator, Mozilla Firefox) operating thereon for facilitating communications over Internet 110. The web browser may access and read marked-up documents (e.g., HTML documents) from, for example, content publishers 115 and then translate and render those documents into webpages that can be viewed by end users at user computer 120. Although only one user computer 120 is shown in FIG. 1, those of skill in the art will appreciate that the system for video content association 100 can be in communication with multiple user computers.

In an exemplary embodiment, each content publisher 115 can be a publisher of webpage(s) over Internet 110. For example, and not limitation, one content publisher may be the computing system responsible for publishing the webpages viewable at www.cnn.com. Another content publisher may be the computing system responsible for publishing the webpages viewable at www.espn.com. Each content publisher 115 may include one or more web servers for receiving and responding to requests from user computers 120 for access to the webpage(s) provided by the content publisher. End users of user computers 120 may request access to a given webpage by, for example, typing the Universal Resource Locator ("URL") for that webpage into an address region of a web browser display or by selecting a link for the webpage from a list of search results (e.g., Google search results).

In an exemplary embodiment, the system for video content association 100 can provide a video association controller 105. The video association controller 105 in an exemplary embodiment can enable the dynamic association of video content with a webpage. As shown in FIG. 1, the video association controller 105 can be configured to receive a request for content association via a connection to the Internet 110 by the system for video content association 100. In an exemplary embodiment, the request for content association can be automatically generated when a user computer 120 requests a webpage from content publisher 115 via the Internet 110.

Embedded within the code for the webpage can be a script that can transmit a request for content association to the video association controller 105 of the system for video content association 100 in an exemplary embodiment. In response to a request for content association the video association controller 105 can enable a determination to be made as to whether certain video content can be associated with the webpage initializing the request for content association. If the determination is made by the video association controller 105 that certain video content should be associated with a particular webpage, then links can be created on that particular webpage, in an exemplary embodiment, to the selected video content.

Significantly, the video association controller 105 of the system for video content association 100 in accordance with an exemplary embodiment of the present invention can enable the real time association of video content to webpages requested by a user computer. For example, and not limitation, a user computer 120 can request a particular webpage from a content publisher 115. In real time, the video association controller 105 can be engaged to respond to an automatically generated request for content association resulting from the request of the webpage of the content publisher 115. The video association controller 105 can make a real time determination as to what videos to associate with a particular webpage and enable links to be displayed to the appropriate videos on the webpage simultaneously or within moments of the display of the webpage on the user computer 120.

Figure 2:
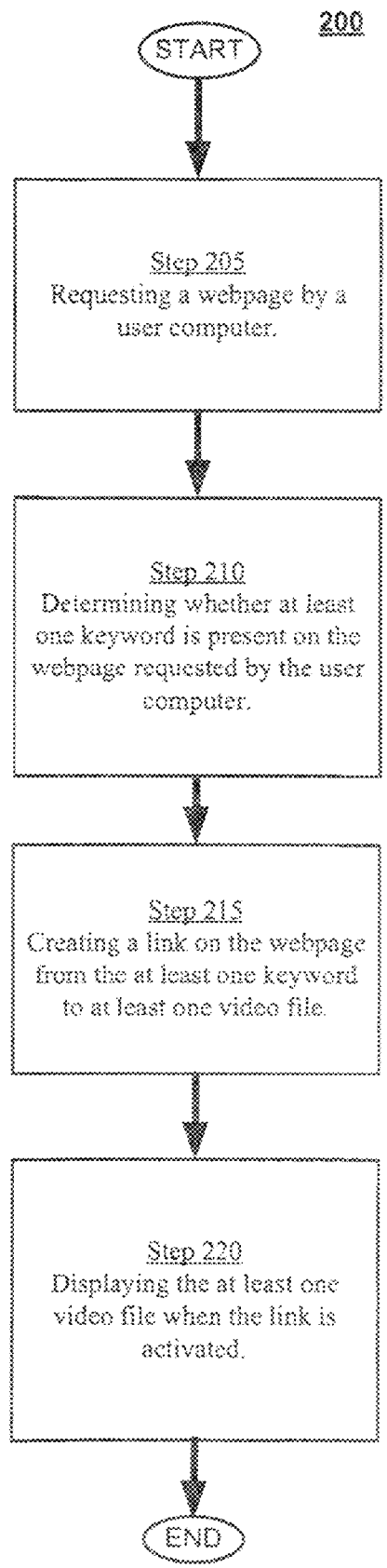
FIG. 2 provides an illustration of a block diagram of the method for associating video content 200 in accordance with an exemplary embodiment of the present invention.

FIG. 2 provides an illustration of a block diagram of the method for associating video content 200 in accordance with an exemplary embodiment of the present invention. As shown in FIG. 2, the requesting step 205 of the method for associating video content 200 involves the request of a webpage by a user computer. In an exemplary embodiment, the user computer requests a particular webpage upon the initiation of a request by a user clicking on a link or entering a Uniform Resources Locator ("URL") into a browser running on the user computer. In alternative embodiment, the user computer requests a particular webpage in response to an automatic webpage request from an application or tool running on the user computer. Once a webpage has been requested, the determining step 210 of an exemplary embodiment of the method for associating video content 200 involves determining whether a keyword is present on the webpage requested by the user computer.

The determining step 210 can be performed based upon a pre-stored parsing of the webpage or can be based upon a real time parsing of the webpage. In an exemplary embodiment, the determining step is executed by accessing a keyword association list for the particular webpage requested. The keyword association list in this exemplary embodiment can be based upon a previously performed parsing of the webpage. Thereby, in this exemplary embodiment, a database can store numerous keyword association lists for numerous webpages. Thus, the determining step 210 in an exemplary embodiment of the method for associating video content 200 can simply involve accessing the stored keyword association list for a given webpage. The keyword association list in an exemplary embodiment can provide a list of the keywords contained in a particular webpage and links to one or more video files to be associated with each keyword.

In an alternative embodiment, the determining step 210 can involve parsing the requested webpage in real time with the request for the webpage. Therefore, in this alternative embodiment the determining step 210 requires the requested webpage to be parsed by a content parser to generate a keyword association list. The determining step 210 in this alternative embodiment can be synchronously generated in response to the request from the user computer for the webpage or asynchronously generated.

Upon completion of the determining step 210, the exemplary embodiment of the method for associating video content 200 involves the creating step 215, whereby a link is created on the requested webpage from a keyword to a video file. Those of skill in the art will appreciate that many combinations of keywords and links can be created on the webpage. For example, and not limitation, one keyword can link to multiple video files. Additionally, a keyword may link to a separate video player in which the user can select from multiple associated video files. Furthermore, more than one keyword may link to the same video file or video players.

In an exemplary embodiment, the creating step 215 can occur asynchronously to the rendering of the webpage on the user computer display. In this exemplary embodiment, the creating step 215 can create links on the webpage some period of time, such as one to two seconds, after a webpage has been downloaded and rendered on the user computer display. In an alternative embodiment, the creating step 215 can occur synchronously with the rendering of the webpage.

After the creating step 215 is completed, the exemplary embodiment of the method for associating video content 200 involves the displaying step 220 of displaying a video file when the link created in the creating step 215 is activated. Thus, in an exemplary embodiment, the user can click on the link provided on the webpage in the creating step 215 and cause a video file to be displayed. Those of skill in the art will appreciate that the video can be displayed in a variety of ways without detracting from the scope of the invention. In one embodiment, the displaying step 220 provides an in-browser frame to display the video, such that the video is overlaid on top of a portion of the currently displayed webpage. In another embodiment, a separate browser window can be activated to display the video content. Additionally, in yet another embodiment an in-browser video player is displayed over the existing webpage that displays the video along with other graphics, video, links and other data.

The various embodiments of the system for video content association 100 and the method for associating video content 200 enabled by the present invention provide many significant benefits. Notably, the system for video content association 100 provides the content publisher with a powerful tool to leverage video content of the content publisher. In an exemplary embodiment, the content publisher can rely upon the system for video content association 100 to dynamically associate video content with the textual content of the content publisher's ever changing database of webpages. Content publishers often face a tremendous challenge in attempting to marry relevant video content with textual content. This is especially difficult when textual content and video content are being constantly being added to a website at different times. For example, and not limitation, the author of a news article for www.cnn.com may not be aware of or have access to the www.cnn.com video content associated with her news article. Additionally, this video content may not be available on the website until some time period after the news article has published. An exemplary embodiment of the system for video content association 100 allows for video content to be linked to this exemplary news article as the video content becomes available. In a non-limiting example, a breaking news story regarding a large corporate merger could be released in a text based news article on www.cnn.com at the moment the news breaks. As footage regarding the merger, such as comments from each company's CEO, becomes added to the www.cnn.com database, this video content could be associated to keywords contained in the text based news article webpage. Therefore, a user viewing the text based news article webpage could be provided with instant in-browser access to numerous videos related to the news article that became available after the news article published.

The dynamic video content association ability provided by the various embodiments of the method for associating video content 200 and system for video content association 100 enables many advantages over the prior art. In accordance with an exemplary embodiment of the present invention, the system for video content association 100 can enable viral video content association, wherein video content is associated with a webpage based upon user collected data. For example, and not limitation, an exemplary embodiment the system for video content association 100 can be configured to track and store viral information regarding user's activation of certain video content. Thereby, the system for video content association 100 can modify the video content association such that popular videos are associated more often or given a higher priority in the displayed video player. An exemplary embodiment of the system for video content association 100 can track all user data associated with the video content association, such as which keywords created the most hits for video content and what video content was watch the most often or for the longest periods of time. In an exemplary embodiment, the system for video content association 100 can assign a relevancy score to each video file depending on user activity with respect to that file. In the non-limiting example provided above regarding the news article on the large corporate merger, the system for video content association 100 can track which video file was watched the longest and then associate that video file with a broader range of keywords or additional webpages. Those of skill in the art will appreciate that this is just one example of numerous ways in which viral user data can be relied upon by the system for video content association 100 to dynamically and intelligently alter or configure the association of video content.

Figure 3A:
FIG. 3A provides an illustration of webpage 305 modified by the system for video content association 100 in accordance with an exemplary embodiment of the present invention.

FIG. 3A provides an illustration of webpage 305 modified by the system for video content association 100 in accordance with an exemplary embodiment of the present invention. As shown in FIG. 3A, a webpage 305 can be modified by an exemplary embodiment of the system for video content association 100. The webpage 305 illustrated in FIG. 3A is provided on a travel website, that provides travel information, travel features, and other travel information. The particular webpage 305 shown in FIG. 3A provides a travel article entitled "California, USA." This article describes surfing on the "beaches of Southern California." Additionally, the article of webpage 305 discusses other surfing destinations, such as Hawaii, Costa Rica, and South Africa. In accordance with an exemplary embodiment of the system for video content association 100, the webpage 305 has been modified to include links from certain keywords to certain video content. As shown in FIG. 3A, three keywords 310, 315, and 320 on webpage 305 provide links to video content. More particularly, keyword "California" has been displayed on the webpage 305 with a dashed underlining and a small video icon to the right of the keyword. In the exemplary embodiment depicted in FIG. 3A, the system for video content association 100 modifies the webpage 305 to include this dashed underlining and small video icon for each keyword. The user can then be enabled to activate the links shown on the keywords to view the associated video content.

In the exemplary embodiment depicted in FIG. 3A, the system for video content association 100 enables a video player 325 to be displayed in-browser when one of the keyword links, 310, 315, or 320, is activated by a user. In one embodiment, the keyword links, 310, 315, or 320, can be activated by clicking the keyword or the video icon. In another embodiment, the keyword links, 310, 315, or 320, can be activated simply by a mouse-over of the keyword link. When one of the keyword links, 310, 315, or 320, is activated, the video player 325 can pop-up within the existing frame of the browser. In the exemplary embodiment depicted in FIG. 3A, the user can be enabled to move the video player 325 frame within the frame of the browser. In this embodiment the user can position the video player 325 in the desired area of the browser so that it is not covering up an area of interest on the webpage 305.

In the exemplary embodiment illustrated in FIG. 3A, the video player 325 provides a number of different features to the user. The video player 325 provides inset frame for the video to be viewed and also provides control features to pause, fast forward, rewind, and adjust the volume of the video. Additionally, the video player 325 can provide links to certain other video content. The video player 325 depicted in FIG. 3A was activated in response to the user mousing-over the "South Africa" keyword link 315. When keyword link 315 is activated, the video player 325 can pop up within the browser and begin playing videos relevant to the keyword "South Africa." As shown in FIG. 3A, the video being displayed in the exemplary embodiment of the video player 325 relates to a medicine man from Cape Town, South Africa. The exemplary embodiment of the video player 325 also provides additional links to other video content relating to the "South Africa" keyword link 315, such as a video regarding "Cape Town" generally.

In an exemplary embodiment, the system for video content association 100 can provide for the display of a wide variety of advertising to the user. Therefore, the content publisher can be provided with an additional means of generating advertising revenue by an exemplary embodiment of the system for video content association 100. In the exemplary embodiment shown in FIG. 3A, the video player 325 provides a banner 330 at the bottom of the player 325. This banner 330 can provide graphics relevant to the content publisher's website or advertisements. For example, and not limitation, the content publisher could generate revenue by selling the banner 330 to advertisers. Significantly, the system for video content association 100 can enable targeted and focused marketing by enabling advertisements to be correlated with the keywords or topics relating to a requested or displayed video file. For example, and not limitation, banner 330 in FIG. 3A could be filled with an advertisement relating to the "South Africa" keyword link 315 that generated the video play. In an Ex, banner 330 can be sold by an advertising auction program to bidders interested in a particular keyword. Thereby, in an exemplary embodiment, the system for video content association 100 can enable intelligent advertising based on keyword association.

In addition to advertising banners, like banner 330, the system for video content association 100 can enable the placement of video advertisements. For example, and not limitation, the video player 325 can be configured to display pre-roll advertisement prior to the display of a linked video file. Similarly, the video player 325 can be configured to display post-roll advertisement after the display of a linked video file. Furthermore, the video player 325 can be configured to display mid-roll advertisement during the display of a linked video file or suitable video based advertisement. As with the advertisement banners, the system for video content association 100 can enable these pre-roll, mid-roll, and post-roll video advertisements to be purchased with a real time and dynamic advertisement auction program.

As shown in FIG. 3A, the exemplary embodiment of video player 325 provides an exit button so that the user may close the video player 325 frame when the user has completed watching the video or is finished with the video player 325. In an exemplary embodiment, once the video player 325 has been collapsed, the user can then click or mouse-over another keyword link 310 or 320 to prompt the display of another video or videos in a new video player 325. In a non-limiting example the user can be permitted to mouse-over other keyword links while the video player 325 is active to prompt the display of a different set of videos without collapsing the originally shown video player 325.

Figure 3B:
FIG. 3B provides an illustration of webpage 332 modified by the system for video content association 100 in accordance with an exemplary embodiment of the present invention.
Figure 3B:

FIG. 3B provides an illustration of webpage 332 modified by the system for video content association 100 in accordance with an exemplary embodiment of the present invention. As shown in FIG. 3B, a webpage 332 can be modified by an exemplary embodiment of the system for video content association 100. FIG. 3B provides an illustration of a webpage modified by the system for video content association 100 in accordance with an exemplary embodiment of the present invention. As shown in FIG. 3B, a webpage 332 can be modified by an exemplary embodiment of the system for video content association 100. The webpage 332 illustrated in FIG. 3B is provided on a news website, that provides information regarding a variety of different news topics. The particular webpage 332 shown in FIG. 3B provides an entertainment news article regarding Paris Hilton's release from jail. In accordance with an exemplary embodiment of the system for video content association 100, the webpage 332 has been modified to include links from certain keywords to certain video content. As shown in FIG. 3B, a keyword 335 on webpage 332 can provide links to video content. More particularly, keyword "jail" 335 has been displayed on the webpage 305 with a dashed underlining and a small video icon to the right of the keyword. In the exemplary embodiment depicted in FIG. 3B, the system for video content association 100 modifies the webpage 332 to include this dashed underlining and small video icon for each keyword. The user can then be enabled to activate the links shown on the keywords to view the associated video content.

In the exemplary embodiment depicted in FIG. 3B, the system for video content association 100 enables a video player 325 to be displayed in-browser when the keyword 335 is activated by a user. In one embodiment, the keyword 335 can be activated by clicking the keyword or the video icon. In another embodiment, the keyword 335 can be activated simply by a mouse-over of the keyword link. When the keyword 335 is activated, the video player 325 can pop-up within the existing frame of the browser. In the exemplary embodiment depicted in FIG. 3B, the video player 325 displays both the video content associated with keyword 335 and links to other related video content. As shown in FIG. 3B, the video player 325 provided in accordance with an exemplary embodiment of the system for video content association 100 can be configured to compliment the style, look, and feel of the website 332. Thus, the video player 325 can appear seamless to the website 332 user.

Figure 3C:
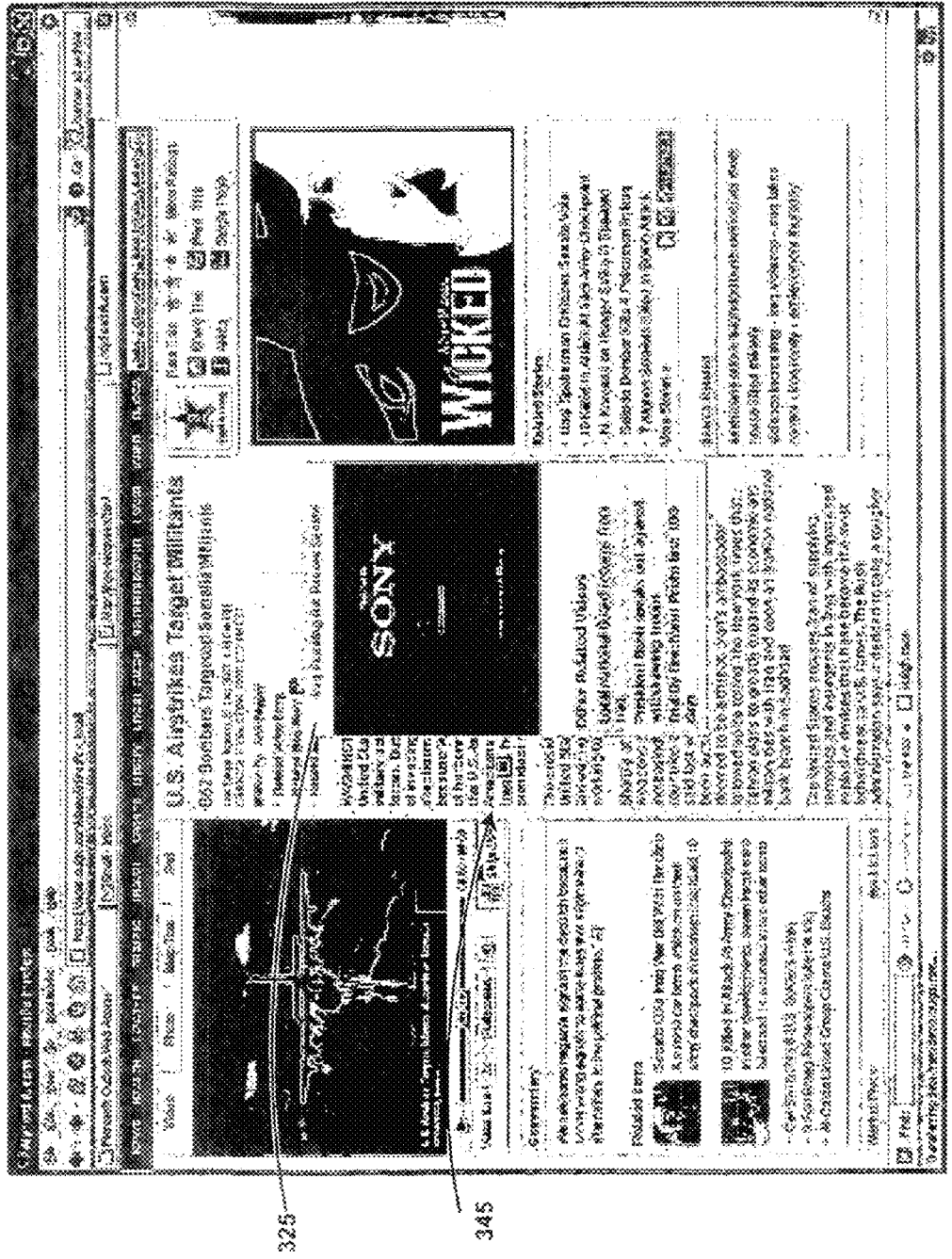
FIG. 3C provides an illustration of webpage 340 modified by the system for video content association 100 in accordance with an exemplary embodiment of the present invention.

FIG. 3C provides an illustration of webpage 340 modified by the system for video content association 100 in accordance with an exemplary embodiment of the present invention. As shown in FIG. 3C, a webpage 340 can be modified by an exemplary embodiment of the system for video content association 100. As shown in FIG. 3C, a webpage 340 can be modified by an exemplary embodiment of the system for video content association 100. FIG. 3C provides an illustration of a webpage modified by the system for video content association 100 in accordance with an exemplary embodiment of the present invention. As shown in FIG. 3C, a webpage 340 can be modified by an exemplary embodiment of the system for video content association 100. The webpage 340 illustrated in FIG. 3C is provided on a news website, that provides information regarding a variety of different news topics. The particular webpage 340 shown in FIG. 3C provides an news article entitled, "U.A Airstrikes Target Militants." In accordance with an exemplary embodiment of the system for video content association 100, the webpage 340 has been modified to include links from certain keywords to certain video content. As shown in FIG. 3C, a keyword 345 on webpage 332 can provide links to video content. More particularly, keyword "Iraq" 345 has been displayed on the webpage 340 with a dashed underlining and a small icon to the right of the keyword. In the exemplary embodiment depicted in FIG. 3C, the system for video content association 100 modifies the webpage 340 to include this dashed underlining and small video icon for each keyword. The user can then be enabled to activate the links shown on the keywords to view the associated video content.

In the exemplary embodiment depicted in FIG. 3C, the system for video content association 100 enables a video player 325 to be displayed in-browser when the keyword 345 is activated by a user. In one embodiment, the keyword 345 can be activated by clicking the keyword or the video icon. In another embodiment, the keyword 345 can be activated simply by a mouse-over of the keyword link. When the keyword 345 is activated, the video player 325 can pop-up within the existing frame of the browser. In the exemplary embodiment depicted in FIG. 3C, the video player 325 displays both the video content associated with keyword 345 and links to other related video content.

Figure 4:
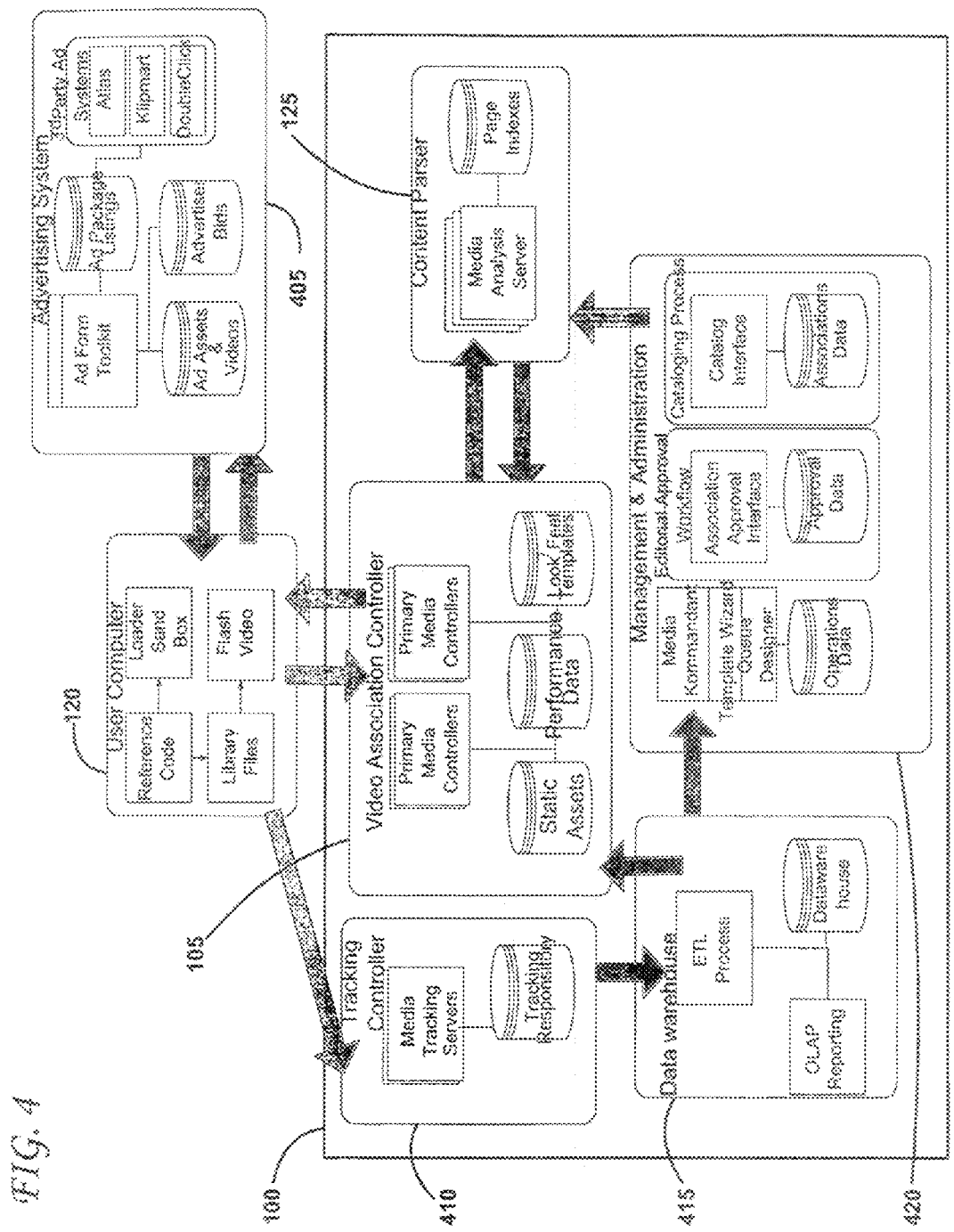
FIG. 4 provides an illustration of the architecture for a system for video content association 100 in accordance with an exemplary embodiment of the present invention.

FIG. 4 provides an illustration of the architecture for a system for video content association 100 in accordance with an exemplary embodiment of the present invention. As shown in FIG. 4, an exemplary embodiment of the system for video content association 100 can provide many various controllers, modules, and components. As shown, the system for video content association 100 can provide a video association controller 105 in an exemplary embodiment. In an exemplary embodiment, the video association controller 105 can enable the dynamic association of video content with keywords on published webpages. For example, the video association controller 105 can be configured to receive a request from a user computer 120 for content association. The video association controller 105 can then make a determination as to whether certain video content can be associated with the webpage initializing the request for content association. If the determination is made by the video association controller 105 that certain video content should be associated with a particular webpage, then the video association controller 105 in an exemplary embodiment can render links on that particular webpage to the selected video content.

The video association controller 105 can rely upon one or more primary media controllers to process requests for content association and make determinations about the videos that are to be linked to a given webpage. The video association controller 105 can enable the real time rendering of keyword links on webpages. For example, the video association controller 105 can store or provide access to stored keyword association lists. In an exemplary embodiment, a keyword association list is created upon the analysis or parsing of a webpage. Therefore, a webpage can be parsed to determine what keywords are contained on the webpage and what relevant video content should be associated with those keywords. For example, and not limitation, the video association controller 105 can contain databases with numerous keyword association lists for numerous webpages. In an exemplary embodiment, reliance upon these predetermined keyword association lists can enable the video association controller 105 to render video content links on webpage in real time with a user's request for a webpage. In a non-limiting example, the user requests a webpage and shortly after the webpage is downloaded and displayed on the user computer 120, the video association controller 105 alters the display of the webpage to contain a number of different keyword links.

One of the significant advantages of an exemplary embodiment of the system for video content association 100 is that the video association controller 105 can intelligently and dynamically modify, in real time, the video content, advertising content, on other data that is to be associated with a particular keyword on a particular webpage. In an exemplary embodiment, selection of video content and advertising content by the video association controller 105 can be done based upon a yield optimization algorithm. In an exemplary embodiment, the yield optimization algorithm relies upon a set of criteria to prioritize the video content, advertising content, on other data to be displayed to the user.

For example, and not limitation, the yield optimization algorithm can be configured to give priority to video content that has been watched by users, on average, for longer lengths of time than other video content. Additionally, the yield optimization algorithm can be configured to give priority to advertising content that generated the most user clicks. Those of skill in the art will appreciate that the yield optimization algorithm can rely upon a set of criteria that incorporates a number of various types of parameters and prioritizes each criterion in a predetermined manner. Thus, video content and advertising content can be selected by an exemplary embodiment of the video association controller 105 according to an analysis of priority assignments to multiple criteria.

For example, and not limitation, the video association controller 105 can implement the yield optimization algorithm to display a video content file that has generated the most interest within the last few hours. As user interest changes rapidly, the video association controller 105 of an exemplary embodiment of system for video content association 100 can dynamically adapt the video content and advertising content associated with certain keywords on particular webpages in accordance with changes in user interest. In an non-limiting example, a content publisher may decided that relevancy is the most critical criteria for video content and advertising content association on the content publisher's webpage. Therefore, in this non-limiting example, the video association controller 105 can implement a yield optimization algorithm that assigns priority based solely on relevancy criteria. In another embodiment, the video association controller 105 can implement a yield optimization algorithm that assigns priority based solely on advertising revenue criteria.

In an exemplary embodiment, the video association controller 105 can implement a yield optimization algorithm that controls all of the content displayed in a video player 325. Therefore, the yield optimization algorithm can control the particular video content file that is first displayed when a video player 325 is displayed in response to the activation of a keyword. Furthermore, the yield optimization algorithm in an exemplary embodiment can dictate the particular video content files that are shown as links in the video player 325. Additionally, the yield optimization algorithm in an exemplary embodiment can dictate the advertising graphic that is displayed in a particular video player 325. For example, and not limitation, the video player 325 can display video content with a higher priority designation at a higher location on the video content link list shown in the video player 325.

Those of skill in the art will appreciate that the stored keyword association lists can be constantly updated and modified by the video association controller 105. For example, and not limitation, the video association controller 105 can associate and prioritize video content in accordance viral information regarding user activity. In this exemplary embodiment, the video association controller 105 can associate a video file that has been played on average for a longer time that other video files in the past two hours. Alternatively, the video association controller 105 in an exemplary embodiment can associate a video file that has generated the most advertising revenue in the past 30 minutes, through clicks or other revenue generation features. Those of skill in the art will appreciate that the set of criteria on which video association controller 105 can make video content associations can be a wide variety of parameters or set of parameters, such as user data, content publisher data, advertising data, website data, or other information.

For example, and not limitation, the video association controller 105 can modify a keyword association list by the time of day, such that certain video content is linked at appropriate times of the day. In a non-limiting example, the video association controller 105 can render keyword links on a webpage relating to "Napa Valley" to videos of vineyard tours and sightseeing locations in the daytime and then render keyword links to videos of gourmet dinners and wine tastings in the evening. In another example, video association controller 105 can alter video content based on geographic information regarding the user, such as showing different videos to users on the West Coast as opposed to users on the East Coast. In this manner, an exemplary embodiment of the video association controller 105 can provide video content association in accordance with a large variety of different parameters, such as user data, content rankings, date of content, content sponsorship, and other parameters. Thereby, in an exemplary embodiment, the video association controller 105 can be configured to associate video content in a manner that drives the most incremental views for a video database and substantial revenue for the content publisher.

In addition to controlling the video content associated with a given keyword on a webpage, an exemplary embodiment of the video association controller 105 can render keyword links and video players on content publisher's webpage in a manner that is consistent with the style of the content publisher's website. Therefore, the exemplary embodiment of the video association controller 105 can store look and feel templates for certain websites to receive commands from the video association controller 105. In a non-limiting example, the video association controller 105 could store a template consistent with the styling and functionality of the www.msn.com website. In this example, the video association controller 105 could rely upon www.msn.com templates to create keyword links on the webpages of the www.msn.com website that are consistent with the style of the website. Additionally, the video association controller 105 can provide a video player to be displayed over the webpage that is consistent with the style and formatting of the website. Therefore, the rendered webpage modifications enabled by the video association controller 105 can seamlessly appear within and in association with website.

In the exemplary embodiment depicted in FIG. 4, the video association controller 105 provides a database for the storage of static assets, such as the video files, templates, and keyword association lists. In this architecture, the video association controller 105 can be provided with convenient and efficient access to the video file library. In an alternative embodiment, the video association controller 105 communicates with an external module that stores the video file library.

As shown in FIG. 4, an exemplary embodiment of the system for video content association 100 can include a content parser 125. The content parser 125 can enable the parsing the webpages of content publisher webpages. In an exemplary embodiment, the content parser 125 can enable a webpage to be parsed to analyze the content of the webpage to determine whether relevant keywords or other targets exist on the webpage. Those of skill in the art will appreciate that while the discussion herein focuses on video content with keywords, the video content can be associated with many other aspects of the webpage, including graphics, icons, logos, or other targets. The content parser 125 can generate the keyword association list in an exemplary embodiment of the system for video content association 100.

In this embodiment, the content parser 125 can provide one or more media analysis servers to analyze webpage for keyword targets. If a keyword targets is discovered on a webpage during the parsing process, the media analysis server can initially determine the relevant video content to be associated with that particular keyword. Subsequently, the media analysis server can generate the keyword association list that associates a keyword with a one or more video files. For example, and not limitation, if the media analysis server of the content parser 125 discovers the keyword "surfing" on a webpage, then the media analysis can create an entry in the keyword association list that associates this instance with the keyword "surfing," with a number of different surfing, beach or sport related videos. The content parser 125 can be configured to generate keyword association lists according to a variety of parameters, such that videos are assigned by themes, subjects, authors, or other types of groupings or associations.

The content parser 125 in an exemplary embodiment can constantly update its resources to provide for better and more intelligent association of video content. Therefore, as changes are made to the video library available for content association, the content parser 125 can dynamically alter previous and future content associations based on those changes. For example, if a new library of documentaries regarding endangered animals is added to the video library available to the system for video content association 100, the content parser 125 can dynamically alter its analysis and content associations such that keywords relating to the endangered animals can be linked to the relevant endangered animal video footage. It is this significant capability that permits a content publisher to dynamically and rapidly leverage the video content of a particular website. Simply by tagging a particular piece of video footage and placing it in the video library available to the system for video content association 100, the content publisher can instantly have that video associated with relevant content throughout the entire website of the content publisher.

In an alternative embodiment, the content parser 125 does not actually perform the process of video content association. Rather, the content parser 125 simply indexes the keywords contained in a particular webpage. In this embodiment, the video association controller 105 can be enabled to obtain these indexed lists from the content parser 125 regarding particular webpages and then the video association controller 105 can configure the video content to be associated with the various keywords on a webpage.

As shown in FIG. 4, an exemplary embodiment of the system for video content association 100 can also provide a tracking controller 410. The tracking controller 410 in an exemplary embodiment can be configured to track a large variety of data relating to the delivery and display of video content associations and video content. In an non-limiting example, the system for video content association 100 can be configured such that data is automatically sent from the user computer 120 to the tracking controller 410. The tracking controller 410 can be an independent device or one configured with other components of the system for video content association 100. The tracking controller 410 can provide one or more media tracking servers. In an exemplary embodiment, the media tracking servers can store all user level entries with respect to video content association on a webpage displayed on the user computer 120, such as whether a keyword link was activated by the user, what videos were played by the user, how long or how many times the videos were watched, how long the videos were paused, what videos lead to additional video file display, and a variety of other user data. In addition to tracking user activities, the tracking controller 410 in an exemplary embodiment can be configured to monitor and store data relating to delivery of video association content by the video association controller 105. Therefore, in this embodiment, the tracking controller 410 can monitor how many webpages were modified by the video association controller 105, how many keyword links were displayed on each modified webpage, and any errors or malfunctions that occurred in the delivery.

The system for video content association 100 can also provide the ability to interact with an advertising system 405 in an exemplary embodiment. In one embodiment, the advertising system 405 can be a third party system entirely independent and separate from the system for video content association 100. In alternative embodiments, the advertising system 405 can be partially or fully incorporated into the system for video content association 100. As shown in FIG. 4, the advertising system 405 exists independent of the system for video content association 100 but can be enabled to work cooperatively with the system for video content association 100. As previously described, the video association controller 105 in an exemplary embodiment can enable a video player to be displayed on the user computer 120. In some embodiments, this video player is enabled to display advertising graphics and the videos displayed to the user can contain pre-roll, mid-roll, and post-roll advertising during the play of the associated video content. In an exemplary embodiment, the placement and selection of this advertising can be facilitated by the advertising system 405.

For example, and not limitation, the advertising system 405 can dynamically provide the banner advertising to be displayed in the video player according to an advertisement auction program. Therefore, in this example, the advertising system 405 enables entities to bid on keyword association through an advertisement auction program. In a non-limiting example, a real time auction can be conducted for the keyword "Cape Town," and the advertising system 405 can enable the highest bidder for this keyword to have their advertising displayed by the video player. Those of skill in the art will appreciate that the advertising system 405 can determine which advertisements are shown, manage the advertising listings, administer advertising budgets, and perform other advertising administration, delivery, and management functions.

In an exemplary embodiment of the system for video content association 100, the management and administration module 420 can implement some of the basic functions of content association. For example and not limitation, the management and administration module 420 can provide the reporting for the system for video content association 100, including reporting user activity and revenue associated with that user activity. In an non-limiting example, the reporting information generated by the management and administration module 420 can include a determination of the length that a particular piece of video content was played by a particular user. Additionally, the reporting information provided by an exemplary embodiment of the management and administration module 420 can detail the clicks made by the user with respect to the video content, such as clicks on links provided inside the video player 325.

Additionally, in an exemplary embodiment, the management and administration module 420 of the system for video content association 100 can perform video cataloging functions. In an exemplary embodiment, the management and administration module 420 can include a cataloging process module 425 enabled to define keywords, provide for editorial approval of video content, and perform certain steps of the keyword association with video content. An exemplary embodiment of the management and administration module 420 can include a template wizard. In this exemplary embodiment, the template wizard can be enabled to create custom skins and styles for particular video players. The template wizard, in an exemplary embodiment, can create a video player with a style that comports to a particular website. Furthermore, the management and administration module 420 can include a queue designer to provide a list of available video content made available by a content publisher.

In an exemplary embodiment, the system for video content association 100 can include a data warehouse 415 providing a Extraction, Transfer, and Load ("ETL") module. In an exemplary embodiment, the ETL module can enable video content and other data to extracted, transferred, and loaded from various content publisher databases to the data warehouse 415 of the system for video content association 100. The ETL module, in an exemplary embodiment, can also format and amended the video content to be stored and provided in predetermined formats. Additionally, the data warehouse 415 of an exemplary embodiment of the system for video content association 100 can provide an On-Line Analytical Processing ("OLAP") module to enable a wide variety of the video content formats to be interpreted and processed. In an exemplary embodiment, the OLAP module can enable video content and other data to be grouped in cubes to enables queries to be efficiently performed on the data.

Exemplary Embodiment of a Method for Associating Video Content 200

The architecture of the exemplary embodiment of the system for video content association 100 shown in FIG. 4 enables the execution of a number of different embodiments of the method for associating video content 200. The steps outlined below outline the flow of an exemplary embodiment of the method for associating video content 200:

Method Flow

Webpage loads in user's browser on user computer.
Request is automatically sent upon request of webpage to the video association controller 105 of the system for video content association 100.
Video association controller 105 determines if the webpage has already been processed by the content parser 125.
If the webpage has not been parsed by the content parser 125, then:
The content parser 125 parses the content and creates a new keyword association list for the webpage.
At regular intervals, the content parser 125 can check for new webpages, downloads their content, and review the content for potential relationships.
Content parser 125 records available relationships in the database for later video association controller 105 consumption.
If the requested webpage has been processed by the content parser 125, the video association controller 105 can use exponentially weighted averages considering both relevancy and performance to determine which words to highlight and videos to show.
Video association controller 105 sends display instructions back to user's browser.
The user's browser processes the video association controller 105 response and highlights words appropriately and initializes the system that will display a video player overlay upon keyword activation (click or mouse-over).
Upon return of video association controller 105 response, user browser starts sending regular information to tracking controller 410 describing user interactions with the highlighted keywords.
User interacts with a highlighted keyword.
Video player overlay displays on the user's browser view.
Video player overlay renders custom-designed publisher styles.
Browser code sends information about page, section, highlight phrase, and related videos to the advertising system 405 and requests ad package.
Advertising system 405 reviews existing rules and available listings/budgets and returns an ad package.
Video player renders ad package from advertising controller 405 within and among the existing playlist.
Video player overlay and library code continues to inform tracking controller 410 about user interactions including content consumption, overlay display time, and clicks.

Figure 5:
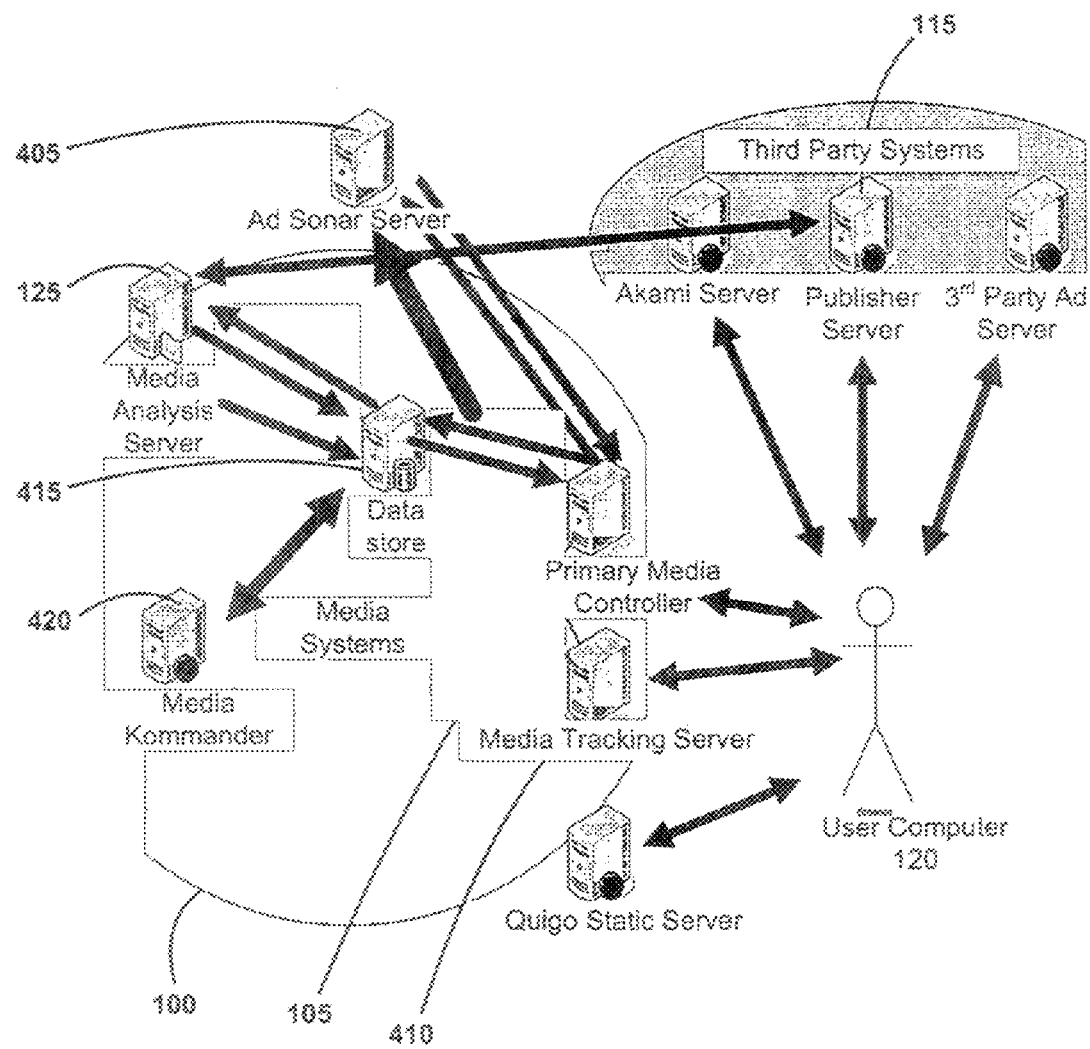
FIG. 5 provides an illustration of the architecture for a system for video content association 100 in accordance with an exemplary embodiment of the present invention.

FIG. 5 provides an illustration of the architecture for a system for video content association 100 in accordance with an exemplary embodiment of the present invention. The system for video content association 100 layout depicted in FIG. 5 provides a illustration of interconnectivity and communications between the components of an exemplary embodiment of the system for video content association 100. As shown in FIG. 5, the user computer 120 can communicate directly with the video association controller 105 to send requests for video content association and receive commands from the video association controller 105. In this exemplary embodiment, the video association controller 105 can then communicate with the data warehouse 415 to retrieve keyword association lists for requested webpages and the video content to be served in response to the user computer request. Thereby, the video association controller 105 can communicate directly with the user computer 120 to render the appropriate keyword links on the webpage displayed on the user computer 120.

As shown in FIG. 5, the content parser 125 can be configured to communicate with the content publishers 115. In this embodiment, the content parser 125 can retrieve new and newly updated webpages from the content publishers 115 for parsing. The content parser 125 is further provided in communication with the data warehouse 415 in the exemplary embodiment depicted in FIG. 5. The content parser 125 can be configured to transfer the keyword association lists created from the parsing of webpages to the data warehouse 415 for storage and retrieval by the video association controller 105. The exemplary embodiment of the system for video content association 100 shown in FIG. 5 can also provide an advertising system 405. The advertising system 405 can be enabled to communicate advertising data and instructions to the video association controller 105 for display in the video player. The advertising system 405 can also be configured to receive advertising data and instructions from third party advertising servers. Furthermore, the exemplary embodiment can provide a tracking controller 410 in direct communication with the user computer 120. Through this direct link, the tracking controller 410 can be configured to monitor user activity with regard to the content association rendered by the video association controller 105.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method for associating video content, the method comprising the following operations performed by at least one processor:
   receiving a request for a webpage from a user computer, the webpage containing textual content related to a topic;
   determining whether at least one keyword is present on the webpage requested by the user computer by comparing the textual content to a keyword association list for the webpage, the keyword association list created in accordance with a yield optimization algorithm;
   identifying a priority ranking of a plurality of video files associated with the at least one keyword based on tracked user data associated with the video files;
   selecting a video file having a highest priority ranking based on the tracked user data;
   modifying the requested webpage by creating a link on the webpage from the at least one keyword to the selected video file; and
   displaying the selected video file when the link is activated;
   wherein the yield optimization algorithm dynamically modifies the prioritization of the plurality of video files associated with the at least one keyword.

2. The method for associating video content of claim 1, wherein the determining step involves parsing the webpage to determine whether the at least one keyword is present in the webpage.

3. The method for associating video content of claim 1, wherein the displaying step includes providing a video player to display the at least one video file.

4. The method for associating video content of claim 3, wherein the video player is shown as an overlay to the webpage.

5. The method for associating video content of claim 3, wherein the video player displays a plurality of video files.

6. The method for associating video content of claim 3, wherein the video player displays an advertisement.

7. The method for associating video content of claim 1, wherein the at least one video file includes an advertisement.

8. The method for associating video content of claim 7, wherein the advertisement is a pre-roll advertisement displayed prior to the display of the at least one video file.

9. The method for associating video content of claim 8, wherein the step of creating the link occurs contemporaneously with the downloading of the webpage onto the user computer.

10. The method for associating video content of claim 1, wherein the tracked user data includes whether the link to the at least one video file was activated.

11. The method for associating video content of claim 1, wherein the tracked user data includes how long the at least one video file was played.

12. The method for associating video content of claim 1, wherein the step of creating the link is modified based on the tracked user data collected.

13. The method of claim 1, further comprising:
   displaying the modified webpage to the user computer; and
   displaying the selected video file on the modified webpage when the link is activated by clicking on the link, or by a mouse-over of the link.

14. The method of claim 1, wherein the webpage is modified synchronously with the rendering of the webpage on the user computer display.

15. The method of claim 1, wherein the webpage is modified a period of time following rendering of the webpage on the user computer display.

16. A system for video content association, the system comprising:
   a plurality of video files stored in a database; and
   a video association controller configured to execute instructions, via a processor, to:
      receive a request for video content association when a webpage containing textual content related to a topic is requested for display;
      determine whether the webpage contains at least one keyword using the textual content and a keyword association list created in accordance with a yield optimization algorithm;
      identify a priority ranking of video files associated with the at least one keyword based on tracked user data associated with the video files;
      select a video file having a highest priority ranking based on the tracked user data; and
      modify the webpage by creating a link on the webpage from the at least one keyword to the selected video file;
      wherein the yield optimization algorithm dynamically modifies the prioritization of the video files associated with the at least one keyword.

17. The system for video content association of claim 16, wherein the video association controller is enabled to provide a video player to display the selected video file on the user computer when the link is activated.

18. The system for video content association of claim 16, further comprising a keyword association list stored in the database relating to the webpage, wherein the video association controller is enabled to access the keyword association list to determine whether the webpage contains the at least one keyword.

19. The system for video content association of claim 16, further comprising a content parser to parse the webpage for the at least one keyword.

20. A method for tracking video content relevancy, the method comprising the following operations performed by at least one processor:
   displaying a webpage containing textual content related to a topic in a browser;
   dynamically modifying the displayed webpage by creating a plurality of keyword links on the webpage to a plurality of video files associated with the plurality of keywords using a keyword association list created in accordance with a yield optimization algorithm;
   displaying one of the plurality of video files when the corresponding one of the plurality of keyword links is activated;
   tracking user data by monitoring which of the plurality of keyword links is activated;
   assigning priority ranking to each of the plurality of video files based on the tracked user data; and
   dynamically updating the plurality of keyword links on the webpage based on the assigned priority rankings of the video files by modifying the prioritization of the plurality of video files using the yield optimization algorithm.

21. The method for tracking video content relevancy of claim 20, wherein a first video file from the plurality of video files with a low relevancy score is eliminated from association with the plurality of keyword links.

* * * * *